United States Patent
Watanabe

(10) Patent No.: US 12,072,064 B2
(45) Date of Patent: Aug. 27, 2024

(54) HYDROGEN GAS FILLING METHOD AND HYDROGEN STATION

(71) Applicant: KITZ CORPORATION, Chiba (JP)

(72) Inventor: Osamu Watanabe, Chiba (JP)

(73) Assignee: KITZ CORPORATION, Tokyo (JP)

( * ) Notice: Subject to any disclaimer, the term of this patent is extended or adjusted under 35 U.S.C. 154(b) by 193 days.

(21) Appl. No.: 17/442,892

(22) PCT Filed: Mar. 26, 2020

(86) PCT No.: PCT/JP2020/013779
§ 371 (c)(1),
(2) Date: Sep. 24, 2021

(87) PCT Pub. No.: WO2020/203679
PCT Pub. Date: Oct. 8, 2020

(65) Prior Publication Data
US 2022/0196210 A1   Jun. 23, 2022

(30) Foreign Application Priority Data

Mar. 29, 2019  (JP) .................................. 2019-067699

(51) Int. Cl.
*F17C 5/06* (2006.01)
*F17C 13/02* (2006.01)

(52) U.S. Cl.
CPC .............. *F17C 5/06* (2013.01); *F17C 13/025* (2013.01); *F17C 2227/043* (2013.01); *F17C 2265/065* (2013.01)

(58) Field of Classification Search
CPC ................ Y02E 60/32; F17C 2227/04; F17C 2221/012; F17C 2260/025; F17C 5/06;
(Continued)

(56) References Cited

U.S. PATENT DOCUMENTS 9,464,761 B2 * 10/2016 Nagura ..................... F17C 5/06
2015/0090364 A1 * 4/2015 Elgowainy ................ F17C 5/06
141/69

(Continued)

FOREIGN PATENT DOCUMENTS

JP   2004076595 A  *  3/2004  ............. F02M 26/08
JP   2004-293752       10/2004
(Continued)

OTHER PUBLICATIONS

JP-6429085-B2 English Translation of Specification (Year: 2023).*
(Continued)

*Primary Examiner* — David Colon-Morales
*Assistant Examiner* — Stephanie A Shrieves
(74) *Attorney, Agent, or Firm* — Wenderoth, Lind & Ponack, L.L.P.

(57) ABSTRACT

Provided are a method for filling hydrogen gas into banks, configured so as to typically maintain high-pressure banks, thereby reducing time delays for supplying hydrogen gas to a second and subsequent FCV; and a hydrogen station. The hydrogen gas filling method and the hydrogen station are characterized by: filling hydrogen gas from a compressor into a bank (target bank) of which pressure is below the preset predetermined pressure; and if there are a plurality of other target banks, selecting as the filling bank a bank that may reach the filled state the fastest by being filled with hydrogen gas from the compressor.

7 Claims, 5 Drawing Sheets

(58) Field of Classification Search
CPC ........ F17C 2227/0157; F17C 2227/043; F17C 2227/0388; F17C 2250/043; F17C 2250/0673; F17C 2265/065; F17C 2270/0139; F17C 13/025; F17C 5/007
USPC ............................................................ 141/4
See application file for complete search history.

(56) References Cited

U.S. PATENT DOCUMENTS

| | | | | |
|---|---|---|---|---|
| 2017/0336028 | A1* | 11/2017 | Cohen | F17C 13/04 |
| 2018/0023764 | A1* | 1/2018 | Okuno | F17C 5/06 |
| | | | | 141/197 |
| 2018/0038550 | A1* | 2/2018 | Kondo | E02F 9/261 |

FOREIGN PATENT DOCUMENTS

| | | |
|---|---|---|
| JP | 2016-153656 | 8/2016 |
| JP | 2016-205439 | 12/2016 |
| JP | 6102006 | 3/2017 |
| JP | 6102006 B2 * | 3/2017 |
| JP | 2018-151043 | 9/2018 |
| JP | 6429085 B2 * | 11/2018 |

OTHER PUBLICATIONS

JP-6102006-B2 English Translation of Specification (Year: 2023).*
JP-2004076595-A English Translation of Specification (Year: 2023).*
International Search Report issued Jun. 16, 2020 in International (PCT) Application No. PCT/JP2020/013779.

* cited by examiner

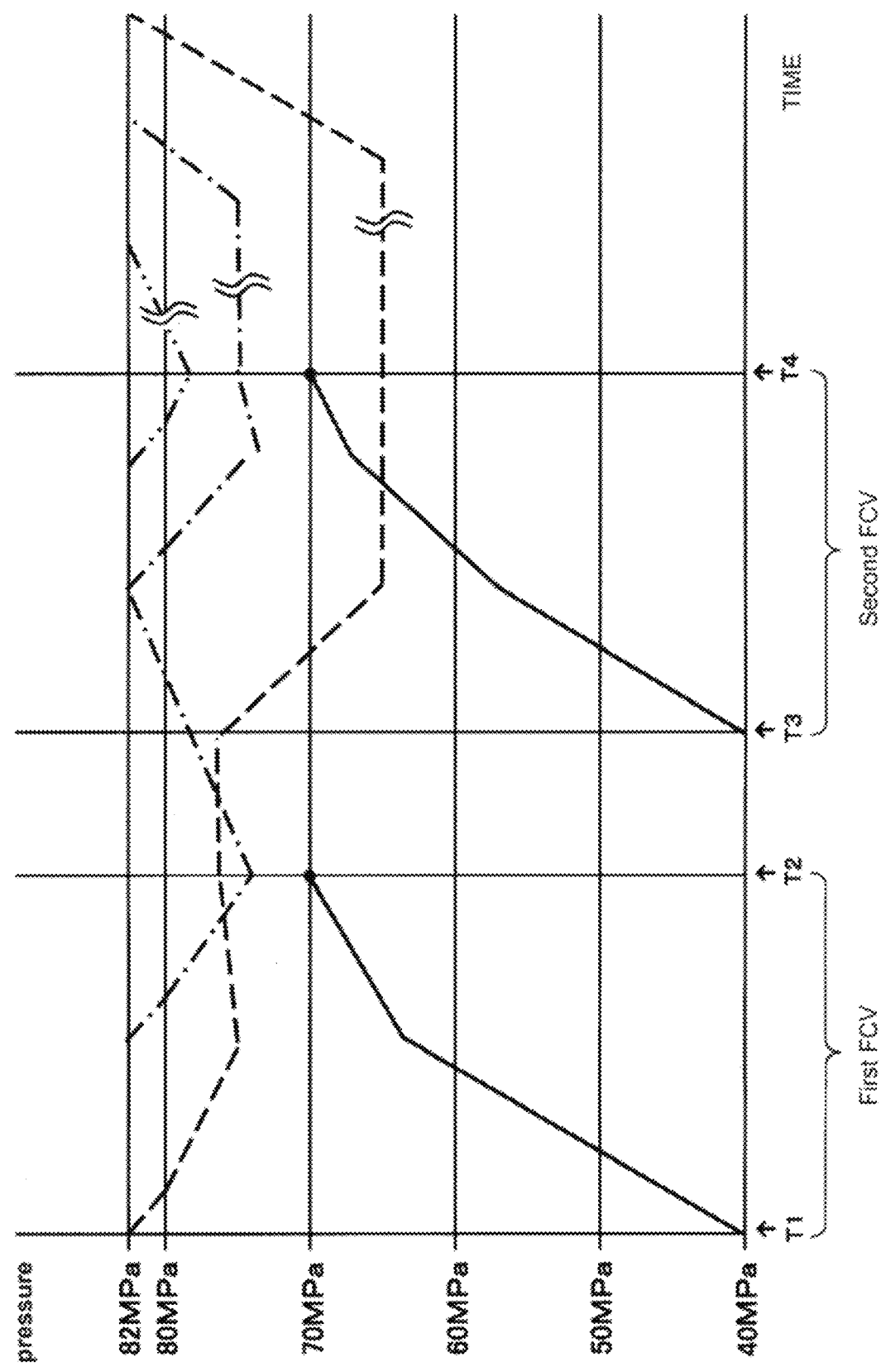

HYDROGEN GAS FILLING METHOD AND HYDROGEN STATION

TECHNICAL FIELD

The present invention relates to a hydrogen gas filling method to an accumulator using in a differential pressure filling method, and a hydrogen station.

BACKGROUND ART

In recent years, as a car small in environmental burden in place of a gasoline car, a fuel cell vehicle (FCV) that used hydrogen as fuel is gaining attention. Since the fuel cell vehicle supplies oxygen-containing air and hydrogen gas that is fuel gas to a fuel cell, and power generated by this is utilized to drive an electric motor to run, there is no discharge such as carbon dioxide ($CO_2$), NOx, SOx and so on such as in a gasoline car, only water is discharged, resultantly the fuel cell vehicle is rendered an environmentally friendly car.

In the FCV, it is main stream to store a sufficient amount of the hydrogen gas in a hydrogen tank in the vehicle in advance, and the hydrogen gas in the hydrogen tank is used in running, supply of the hydrogen gas to the hydrogen tank of the FCV is, in the same manner as a normal gasoline car, performed at the hydrogen station that supplies the hydrogen gas.

As a method for supplying the hydrogen gas to the FCV at the hydrogen station, there is a differential pressure filling method according to which high-pressure hydrogen gas is stored in an accumulator in advance, and due to a pressure difference between the accumulator and the hydrogen tank of the FCV, the hydrogen gas is supplied. In the hydrogen station that uses the differential pressure filling method, it is not necessary to provide a hydrogen gas manufacturing apparatus in a site, such that setup cost and a site area of the hydrogen station can be reduced, and therefore it is suitable for construction in a large city where restriction of securement of ground easily occurs.

Since the differential pressure filling method rapidly supplies the hydrogen gas to the FCV, a multistage accumulator due to plural accumulators storing the hydrogen gas compressed to high-pressure by the compressor is configured. When the hydrogen gas is supplied to the hydrogen tank (fuel tank) of the FCV, by supplying while switching the accumulator to be used, a large differential pressure between pressure in the accumulator and pressure of the hydrogen tank of the FCV is maintained, and due to the differential pressure from the accumulator to the hydrogen tank of the FCV, the hydrogen gas is rapidly supplied.

In the present circumstance, since the number of FCVs is largely scarce compared with that of gasoline cars or the like, the hydrogen stations are not crowded typically. Therefore, in the hydrogen station adopting the differential pressure filling method, the supply apparatus such as the compressors and multistage accumulators or the like are not designed with a margin so as to allow supply of the hydrogen gas to many FCVs in a short time.

Because when the hydrogen gas is supplied from the multistage accumulator to the FCV, the pressure in the multistage accumulator decreases, and therefore it becomes necessary to drive the compressor to refill the hydrogen gas into the multistage accumulator. Therefore, while the hydrogen gas is supplied to a first FCV, or when, immediately after the supply, a second FCV visits to receive the supply of the hydrogen gas, a situation may occur where the second FCV has to wait until the refilling of the hydrogen gas to the multistage accumulator is complete. Thus, a hydrogen gas filling method that rapidly recovers the hydrogen supply capacity of the multistage accumulator is demanded.

As the hydrogen gas filling method like this, in a patent literature 1, a filling control method of the hydrogen gas is disclosed in which when the hydrogen gas is supplied from the plural accumulators to the hydrogen tank of the FCV, at first, an accumulator having a lowest residual pressure is selected and filled, then, to fill an accumulator having a higher residual pressure than the accumulator of which filling came to an end is sequentially repeated to refill the plural accumulators.

Furthermore, in a patent literature 2, a gas filling method is disclosed in which, in a gas filling system provided with plural accumulators, in order from the accumulator with the highest residual pressure, the hydrogen gas is supplied to the hydrogen tank of the FCV, the filling of the hydrogen gas of the accumulator from the compressor and supply from the accumulator to the hydrogen tank of the FCV are performed in parallel.

CITATION LIST

Patent Literature

PTL1: JP 2004-293752 A
PTL2: JP 6102006 B1

SUMMARY OF INVENTION

Technical Problem

However, according to the filling control method of the hydrogen gas of the patent literature 1, although when the pressures of plural accumulators decreased, the accumulator having the lowest residual pressure is preferentially filled with the hydrogen gas. When the hydrogen gas is filled like this, it may take a time until the filling to the multistage accumulator comes to an end and, the hydrogen gas supply to the next FCV becomes possible.

Usually in the hydrogen filling apparatus of the differential pressure filling method, in order to fill the hydrogen gas efficiently in a short time to the FCV, first, from a large capacity bank having large capacity, the hydrogen gas is filed to the FCV. Since the pressure of the hydrogen tank of the FCV is low at the filling start time, the pressure difference between the hydrogen tank of the FCV and the large capacity bank is large. Until the pressure difference between the large capacity bank and the hydrogen tank of the FCV reaches a prescribed value, the supply from the large capacity bank is performed, and thereby the pressure of the large capacity bank decreases largely. As a result, when the bank having the lowest residual pressure is preferentially filled with the hydrogen, roughly the large capacity bank is selected which results in a longer filling time due to the large capacity, and therefore it takes a time until the supply to the second FCV becomes possible.

According to the gas filling method of the patent literature 2, although the hydrogen gas is filled in order from the accumulator having the highest residual pressure to the plural accumulators, and the hydrogen gas is supplied to the hydrogen tank of the FCV in order from the accumulator having the lowest residual pressure, when the hydrogen gas is supplied to the hydrogen tank of the FCV like this, usually, the hydrogen gas is preferentially filled to a medium pressure bank, and a high-pressure bank, the hydrogen gas filling to the low-pressure bank that plays a large role for shortening the supply time in the supply of the hydrogen gas to the FCV is delayed, and an effect of providing the large capacity bank is not sufficiently exhibited, and it may take a time to supply the hydrogen gas to the second FCV.

The present invention is developed to solve the above problem, its object is to provide, by making it typically possible to maintain the high-pressure bank, a filling method to the bank of the hydrogen gas that reduces the delay of the supply time of the hydrogen gas to the second and subsequent FCVs and a hydrogen station.

Solution to Problem

In order to achieve the above object, a first aspect of the invention is a hydrogen gas filling method in which hydrogen gas filling is performed from a compressor to a bank (target bank) of which pressure is below a predetermined pressure, and when there are plural target banks, when selecting a bank that may be filled to a fully-filled state fastest by the hydrogen gas filling from the compressor selected as a filling bank, a hydrogen gas filling amount necessary until full filling is calculated based on the pressure at a time point of each target bank, and based on this, time necessary until full filling is obtained for every target bank, and a target bank having the shortest filling time is selected as a filling bank.

A second aspect of the invention is a hydrogen gas filling method in which hydrogen gas filling is performed from a compressor to a bank (target bank) of which pressure is below the predetermined pressure, when there are plural target banks, when selecting a bank that may be filled to a fully-filled state the fastest based on the criteria by the hydrogen gas filling from the compressor is selected as a filling bank, regarding each bank, relation between the pressure and time necessary until full filling, and based on the relation, by comparing pressure of each bank, and a criterion for judging the size of the time necessary until the full filling by comparing the pressure of each bank are obtained in advance, based on the criterion, a bank that may be filled to the fully-filled state fastest is selected as a filling bank.

A third aspect of the invention is a hydrogen gas filling method in which, in the plural banks, at least one bank having a different capacity from the other banks is contained A fourth aspect of the invention is a hydrogen gas filling method in a hydrogen station having an accumulator unit of plural banks, and the banks, and the plural banks contain at least one bank having a different capacity from the other banks, in which the hydrogen gas filling is performed from a compressor to a bank (target bank) of which pressure is below the predetermined pressure, when there are plural target banks and at least one large capacity bank different in capacity from other banks is contained, a bank that may be filled to the fully-filled state fastest by the hydrogen gas filling from the compressor is selected as a filling bank.

A fifth aspect of the invention is a hydrogen filling method in which while supplying hydrogen to a fuel cell vehicle (FCV) that is a predetermined hydrogen supply destination from one among plural banks, when the hydrogen gas filling is performed from the compressor to one bank among the plural banks, the hydrogen gas filling is performed from the compressor to a bank (target bank) of which pressure is below the predetermined pressure compressor, when there are plural target banks, by selecting a bank that may be filled to the fully-filled state fastest by the hydrogen gas filling from the compressor as a filling bank, and, at the time point when the hydrogen supply to the FCV that is the hydrogen supply destination completed or the bank that may be filled to the fully-filled state fastest was switched, the bank that may be filled to the fully-filled state fastest by the hydrogen gas filling from the compressor is switched.

A sixth aspect of the invention is a hydrogen gas filling method in which while supplying hydrogen to a fuel cell vehicle (FCV) that is a predetermined hydrogen supply destination from one among plural banks, when the hydrogen gas filling is performed from a compressor to one bank among the plural banks, to a bank (target bank) of which pressure is below the predetermined pressure, the hydrogen gas filling is performed from the compressor, when there are plural target banks, by considering a hydrogen gas amount necessary up to the full filling of the FCV and the capacity and hydrogen residual pressure of each bank, a bank that may supply the hydrogen gas most efficiently to the FCV is selected as a bank that supplies the hydrogen to the FCV, and a bank that performs the hydrogen filling from the compressor selects one that may fully fill fastest by considering the supply of the hydrogen gas to the FCV is selected.

A seventh aspect of the invention is a hydrogen station provided with an accumulator unit configured of plural banks, a compressor unit supplying hydrogen gas to the accumulator unit, and a hydrogen supply means supplying the hydrogen gas to a fuel cell vehicle (FCV) from the compressor unit, in which while supplying hydrogen to the FCV that is a predetermined hydrogen supply destination from one among plural banks, when hydrogen gas filling is performed from the compressor to one bank among plural banks, when there are plural target banks, to a bank (target bank) of which pressure is below the predetermined pressure, hydrogen gas filling is performed to a bank that may be filled to a fully-filled state fastest by hydrogen gas filling from the compressor is selected as a filling bank, and at the time point when hydrogen supply destination to the FCV that is the predetermined hydrogen supply completed or a bank that may be filled to the fully-filled state fastest switched, a bank that may be filled to the fully-filled state fastest by the hydrogen gas filling from the compressor is switched.

Advantageous Effect of Invention

According to the first aspect of the invention, when hydrogen gas is supplied to a bank of which pressure is below the predetermined pressure, since a bank that may be filled to a fully-filled state the fastest is selected, the bank may be filled to the fully-filled state the fastest and a high-pressure bank may be maintained. Also, when selecting a bank that may be filled fastest, since the time necessary to full filling is obtained based on pressure of the bank for every target bank, even if there is difference in bank capacity, a bank that may be fully-filled fastest is selected and filled to the fully-filled state, and a high-pressure bank may be maintained.

According to the second aspect of the invention, when the hydrogen gas is supplied to a bank of which pressure is below the predetermined pressure, a bank that may filled to a fully-filled state fastest is selected, by making the bank the fully-filled state fastest, a high-pressure bank may be maintained. Also, when selecting a bank that may be filled the fastest, a relation between the pressure and time necessary to full filling, and based on the relation, by comparing pressure of each bank, a criterion for judging the size of the time necessary to full filling are provided in advance, since based on the criterion a bank that may be filled to the fully-filled state the fastest is selected, even if there is a difference between bank capacities, a bank that may be filled to the fully-filled state the fastest may be easily selected to reach the fully-filled state, and a high-pressure bank may be maintained.

According to the third aspect of the invention, even if the capacity of each bank is different, only by measuring the pressure of each bank, a bank that may be filled to a full-filled state the fastest is selected, and a high-pressure bank may be maintained in a shortest time.

According to the fourth aspect of the invention, the capacities of the banks configuring the accumulator unit are different, and, even when a large capacity bank is contained, when the hydrogen gas is supplied to a bank of which pressure is below the predetermined pressure, since a bank that may be filled to the fully-filled state fastest is selected, the bank can reach the fully-filled state fastest and a high-pressure bank may be maintained.

According to the fifth and sixth aspects of the invention, while supplying the hydrogen to the fuel cell vehicle (FCV) that is the predetermined hydrogen gas supply destination from one of the plural banks, also when the hydrogen gas filling is performed from the compressor to one bank among the plural banks, even when the hydrogen gas supply is performed to a bank of which pressure is below the predetermined pressure, since a bank that may be filled to the fully-filled state fastest is selected, by making the bank reach the fully-filled state fastest, a high-pressure bank may be maintained.

Furthermore, according to the sixth aspect of the invention, by considering a hydrogen gas amount necessary until fully-filling of the FCV, and the capacity and hydrogen residual pressure of each bank, since a bank that may supply hydrogen gas most efficiently to the FCV is selected as a bank that performs the hydrogen supply to the FCV, and a bank that performs the hydrogen filling from the compressor by considering the supply of the hydrogen gas to the FCV, one that may reach the fully-filling fastest is selected by considering hydrogen gas supply to the FCV, efficiency improvement of the hydrogen supply to the FCV is intended and the delay of the supply time of the hydrogen gas to the second and subsequent FCVs may be reduced.

The seventh aspect of the invention is a hydrogen station provided with an accumulator unit configured of plural banks, a compressor unit supplying hydrogen gas to the accumulator unit, and a hydrogen supply means supplying hydrogen to a fuel cell vehicle from the compressor unit, in which when, while supplying the hydrogen to the FCV that is the predetermined hydrogen supply destination from one of the plural banks, the hydrogen gas filling is performed from the compressor to one bank among the plural banks, the hydrogen gas filling is performed from the compressor to a bank (target bank) of which pressure is below the predetermined pressure, when there are plural target banks, a bank that may be filled to the fully-filled state fastest by the hydrogen gas filling from the compressor is selected as a filling bank, and, at the time point when the hydrogen supply to the FCV that is the hydrogen supply destination completed or the bank that may be filled to the fully-filled state fastest was switched, the bank that may be filled to the fully-filled state fastest by the hydrogen gas filling from the compressor is switched, therefore, by making the bank reach the fully-filled state fastest, the high-pressure bank may be maintained. Furthermore, even there is difference between the bank capacities, the fully-filled state may be obtained fastest.

Therefore, without prioritizing a particular bank, even if there is difference between bank capacities, a bank that may be a fully-filled state the fastest is selected and made a fully-filled state, a high-pressure bank may be maintained. The high-pressure bank may fill hydrogen also to a FCV of which pressure becomes high by filling hydrogen to a certain degree. Therefore, for example, such as after supplying hydrogen first from a large capacity bank of which pressure decreased by hydrogen supply before but which maintains sufficient amount of hydrogen, a bank maintaining a high pressure is full filled, by combining well a high-pressure bank and a high-capacity bank, as a whole, hydrogen supply may be performed in a short time. That is, by making typically maintain the high-pressure bank, since it is advantageous to full fill the second and subsequent FCVs, the hydrogen station may be efficiently operated.

BRIEF DESCRIPTION OF DRAWINGS

FIG. 5 is a chart drawing of hydrogen gas supply in an example embodiment.

DESCRIPTION OF EMBODIMENT

Hereinafter, embodiments for carrying out the present invention will be described with reference to drawings.

Figure 1:
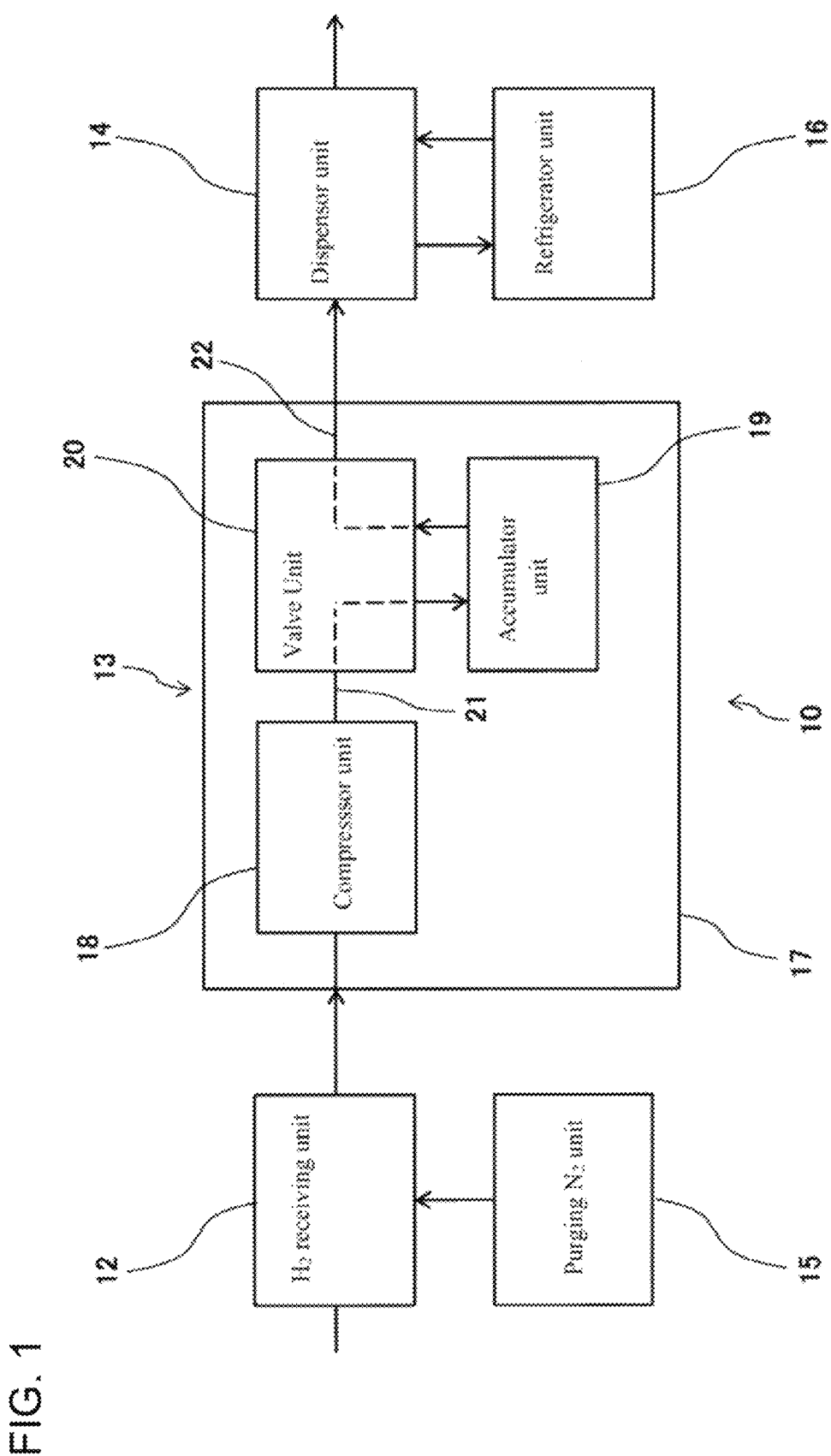
FIG. 1 is a drawing for explaining one example of a structure of a simple type hydrogen station using a hydrogen station package unit in a first embodiment of the present invention.

FIG. 1 shows one example of a structure of a hydrogen station package unit and a simple type hydrogen station using the hydrogen station package unit according to an embodiment of the present invention. In FIG. 1, a simple type hydrogen station 10 is a so-called off-site type hydrogen station, and is configured of a $H_2$ receiving unit 12, a hydrogen station package unit 13, a dispenser unit 14, a purging $N_2$ unit 15, and a refrigerator unit 16.

The $H_2$ receiving unit 12 receives hydrogen gas manufactured in a large scale in an existing industrial plant and sent by a trailer that binds large bombs, or a curdle to the hydrogen station and supplies to the hydrogen station package unit 13.

The hydrogen station package unit 13 is provided with, by packaging, a compressor unit 18, an accumulator unit 19, and a valve unit 20 in a chassis 17. The compressor unit 18 and the accumulator unit 19 are connected by a filling flow path 21 via the valve unit 20, and the accumulator unit 19 and the dispenser unit 14 are connected by a supply path 22 via the valve unit 20.

The dispenser unit 14 supplies the hydrogen gas to a FCV via a filling nozzle (not shown), while controlling a flow rate of the high-pressure hydrogen gas supplied from the accumulator unit 19 in the hydrogen station package unit 13 by a flow rate control valve (not shown). Furthermore, the dispenser unit 14 is provided with a precooler (heat exchanger) (not shown) cooling the hydrogen gas supplied to the FCV (fuel cell vehicle) 50 to a predetermined temperature (for example, −40° C.).

The purging N₂ unit 15 stores purging nitrogen (N₂) gas removing impurities such as air or the like, other than hydrogen remaining in a flow path, in a valve of the hydrogen station package unit 13. As needs arise, the nitrogen is supplied to the hydrogen station package unit 13 via the H₂ receiving unit 12 to purge the hydrogen gas or the like remaining in the flow path.

The refrigerator unit 16 circularly supplies a coolant to the precooler of the dispenser unit 14 to cool the hydrogen supplied to the FCV to a predetermined temperature.

Figure 2:
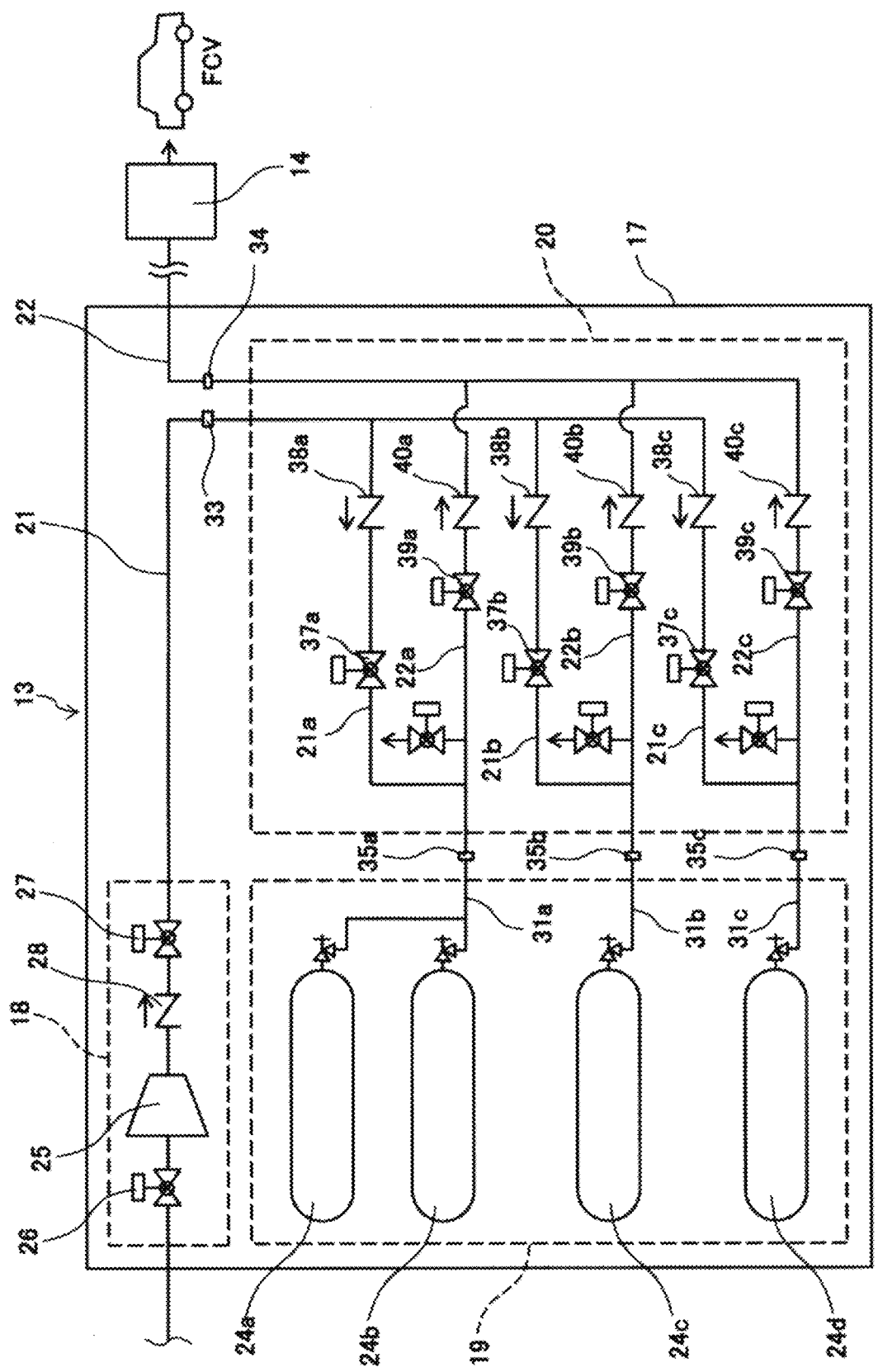
FIG. 2 is a drawing for schematically explaining a structure of the hydrogen station package unit in the first embodiment of FIG. 1.

Next, a structure of the hydrogen station package unit 13 will be described with reference to FIG. 2. As shown schematically in FIG. 2, the hydrogen station package unit 13 is provided with the compressor unit 18, the accumulator unit 19, and the valve unit 20 in the chassis 17 by packaging.

In the hydrogen station package unit 13, hydrogen gas from an external hydrogen supplier (hydrogen curdle or the like) is boosted to a predetermined pressure (for example, about 82 MPa) at the compressor unit 18, and is accumulated via the valve unit 20 in accumulators 24a, 24b, 24c and 24d provided in the accumulator unit 19. The hydrogen gas accumulated in the accumulators 24a, 24b, 24c and 24d passes the valve unit 20, and is finally supplied to the FCV via the dispenser 14.

The hydrogen station package unit 13 is formed into a three-bank structure in which the first bank is configured from the accumulator 24a and the accumulator 24b, the second bank is configured from the accumulator 24c, and the third bank is configured from the accumulator 24d, and the hydrogen gas is supplied by a pressure difference between the first, second and third banks and the hydrogen tank of the FCV, namely into a so-called differential pressure filling method.

Like this, the first bank is configured of two accumulators, the second and third banks are each configured of one accumulator, respectively. Since the accumulators all have the same capacity, the first bank has twice the capacity of that of the second and third banks.

The supply of the hydrogen gas from each bank to the FCV is controlled by the dispenser 14, by switching appropriately the bank supplying the hydrogen gas responding to relation of the pressure difference between the bank and the hydrogen tank of the FCV. The supply of the hydrogen gas to the FCV is controlled such that the supply of the hydrogen gas to the FCV completes in the shortest possible time.

The compressor unit 18 is provided with a compressor (gas compressor) 25, automatic ball valves 26, 27 functioning as a shut-off valve, and a check valve 28. The compressor unit 18 boosts (compresses) the hydrogen gas supplied from the H₂ receiving unit 12, and fills the accumulator unit 19 via the filling path 21.

In order to fill and extract the hydrogen gas to the accumulator, the first bank is connected to a flow path 31a, the second bank is connected to a flow path 31b, and the third bank is connected to a flow path 31c. By the way, since the first bank is configured of two accumulators 24a and 24b, the flow path 31a is branched immediately before the accumulators 24a and 24b, and the branches of the flow path 31a are connected the accumulators 24a and 24b respectively.

The valve unit 20 controls the filling of the hydrogen gas boosted by the compressor unit 18 to the accumulators 24a, 24b, 24c and 24d in the accumulator unit 19 and extraction of the hydrogen gas filled in accumulator 24a, 24b, 24c and 24d. Therefore, the valve unit 20 is provided with an inlet 33 of the hydrogen gas from which branched flow path 21 is detachable, and an outlet 34 of the hydrogen gas from which supply flow path 22 is detachable, and is provided with doorways 35a, 35b, and 35c for the hydrogen gas from which the three flow paths 31a, 31b, 31c of the accumulator unit 19 are detachable.

The filling flow path 21 is branched into a branch flow path 21a supplying the hydrogen gas to the first bank in the valve unit 20, a branch flow path 21b supplying the hydrogen gas to the second bank, and a branch flow path 21c supplying the hydrogen gas to the third bank in the valve unit 20. The branch flow path 21a is connected to the doorway 35a, the branch flow path 21b is connected to the doorway 35b, and the branch flow path 21c is connected to the doorway 35c.

Furthermore, in order to supply the hydrogen gas from the accumulators 24a, 24b, 24c and 24d in the accumulator unit 19 to the dispenser unit 14, a tributary 22a for extracting the hydrogen gas from the first bank, a tributary 22b for extracting the hydrogen gas from the second bank, and a tributary 22c for extracting the hydrogen gas from the third bank are provided. The tributary 22a is connected to the doorway 35a, the tributary 22b is connected to the doorway 35b, and the tributary 22c is connected to the doorway 35c. The tributaries 22a, 22b, 22c are integrated in the valve unit 20 to configure the supply flow path 22.

The branch flow path 21a is provided with an automatic ball valve 37a and a check valve 38a, the branch flow path 21b is provided with an automatic ball valve 37b and a check valve 38b and the branch flow path 21c is provided with an automatic ball valve 37c and a check valve 38c. These automatic ball valves 37a, 37b and 37c are a first valve opening or closing the supply of the hydrogen gas to the accumulator unit 19 from the compressor unit 18. Thereby, the hydrogen gas supply from the compressor unit 18 to the accumulator unit 19 is controlled and the backflow of the hydrogen gas is prevented.

Furthermore, the tributary 22a is provided with the automatic ball valve 39a and the check valve 40a, the tributary 22b is provided with the automatic ball valve 39b and the check valve 40b, and the tributary 22c is provided with the automatic ball valve 39c and the check valve 40c. These automatic ball valves 39a, 39b and 39c are a second valve opening or closing the supply of the hydrogen gas from the accumulator unit 19 to the outlet 34 of the hydrogen gas. Thereby, the supply of the hydrogen gas to the outlet 34 of the hydrogen gas from the accumulator unit 19 is controlled and the backflow of the hydrogen gas is prevented.

Furthermore, the flow path 31a of the first bank, the flow path 31b of the second bank, and the flow path 31c of the third bank are provided with a (not shown) pressure meter, and the residual pressure of the first, second and third banks are measured.

As shown above, the hydrogen station package unit 13 is configured, and the hydrogen gas supplied from the H₂ receiving unit 12 is boosted (compressed) by the compressor unit 18 and filled in the accumulator unit 19, and as needs arise, may be supplied to the dispenser unit 14.

Subsequently, the hydrogen gas filling method of the present invention will be explained.

In the hydrogen station package unit of the present invention, the supply of the hydrogen gas from each bank to the FCV is controlled by the dispenser, and responding to the relation of the pressure difference between the bank and the hydrogen tank of the FCV, by appropriately switching the bank supplying the hydrogen gas, the supply of the hydrogen gas to the FCV completes in the shortest possible time.

On the other hand, the supply of the hydrogen gas to each bank from the compressor is controlled separately from the supply of the hydrogen gas from the bank to the FCV. In the present invention, to a bank in which the pressure of the hydrogen gas decreased to a predetermined value or lower, the hydrogen gas is filled from the compressor. In this case, when the pressure of the hydrogen gas decreased to the predetermined value or lower, and there are plural banks (target banks) to be filled with the hydrogen gas, when the hydrogen gas supply was performed by the compressor from the pressure of this time point, one bank that may be filled to a fully-filled state in the shortest time is selected.

Specifically, when there are plural target banks of which the residual pressure of the hydrogen gas decreased to the predetermined value or smaller, a bank that may be filled to a fully-filled state in the fastest time is selected as the filling bank, and the hydrogen gas is supplied by the compressor to fill.

As a method of selecting the filling bank, there are two methods of (1) a method (first method) calculating a filling time by considering hydrogen residual pressure and capacity of the bank, and (2) a method (second method) tabulating banks to be selected in advance based on the hydrogen residual pressure of the bank. In the following, these two methods will be detailed.

Figure 3:
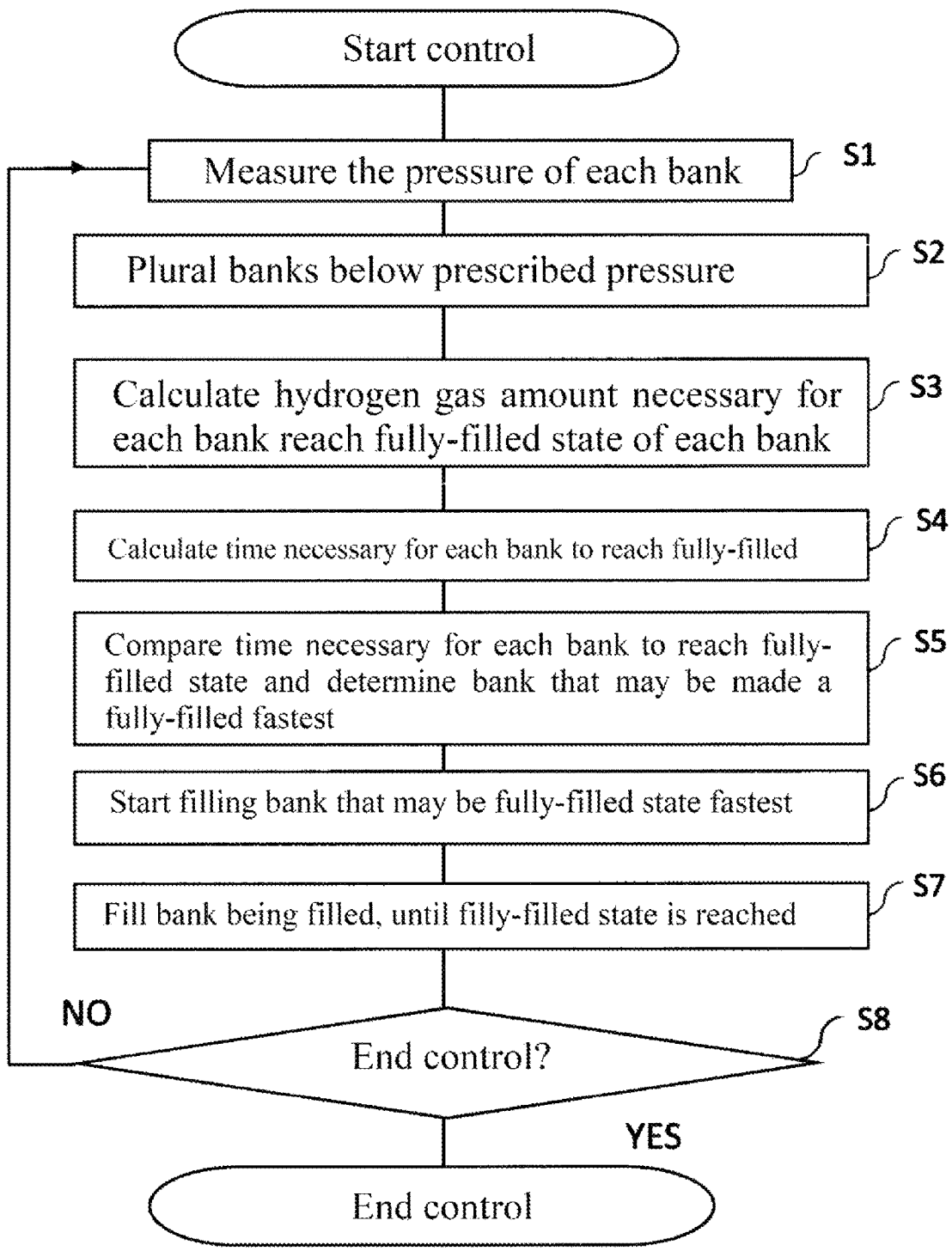
FIG. 3 is a flowchart of a hydrogen gas filling method according to a second embodiment.

The first method calculating the filling time by considering the hydrogen residual pressure of the bank and capacity will be described. FIG. 3 is a flowchart of the filling method of the hydrogen gas by the first method.

When the filling bank that fills the hydrogen gas is selected, firstly, by a pressure meter (not shown), the pressure of each bank (the first, second and third banks) is measured (Step S1). Next, a pressure value of each bank measured is supplied to a (not shown) controller, and it is determined whether there are plural banks of which the pressure is below the predetermined pressure. (Step S2).

When there are plural banks of which the pressure is below the predetermined pressure, a hydrogen gas amount necessary for the fully-filled state of the bank is calculated from a volume of each bank (Step S3). Next, based on the calculated hydrogen gas amount necessary to reach fully-filled state, by considering also the supply capacity of the hydrogen gas of the compressor unit, a time necessary to reach the fully-filled state of each bank is calculated (Step S4). Then, by comparing the times necessary to reach the fully-filled state of each bank, a bank that may be filled to the fully-filled state in the shortest time is determined as the selected filling bank (the bank that may be filled to the fully-filled state the fastest) (step S5).

When the selected filling bank (the bank that may be filled to the full-filled state the fastest) is determined, by controlling the valve unit 20 for supplying the hydrogen gas to the bank from the compressor unit 18, filling of the hydrogen gas to the selected filling bank (the bank that may be filled to the fully-filled state the fastest) is started (Step S6). The supply of the hydrogen gas due to the compressor unit 18 is performed until the selected bank being charged reaches the fully-filled state (Step S7). When the selected bank reaches the fully-filled state, the valve unit 20 is controlled to stop the hydrogen gas supply of the selected bank. Next, it is determined whether the hydrogen gas supply due to the compressor 18 is terminated (Step S8). When determined to be control end, the control is terminated. Furthermore, when determined that it is necessary to supply the hydrogen gas to the other plural banks, the method returns to the step S1, and the bank selection is repeated.

Thus, when there are plural banks in which the hydrogen residual pressure decreased to a predetermined value or smaller, since the bank that may be filled to the fully-filled state the fastest is selected, and the hydrogen gas is supplied by the compressor to fill the hydrogen gas to the selected bank, when there are plural banks necessary to be recovered, the selected bank may be filled to the fully-filled state the fastest and many banks with as high-pressure as possible may be maintained at the short time.

Then, since the bank of which the time until the fully-filled state is reached is short is selected as the filling bank and the hydrogen gas is filled from the compressor, compared with the filling method in which the filling of the hydrogen gas is carried out only from a bank having high residual pressure, the higher high-pressure bank may be easily maintained. In particular, even in a state where the residual pressure of all of the plural banks decreased, when the hydrogen gas is supplied to the FCV, since the supply of the hydrogen gas to the bank due to the compressor becomes severe, a filling method that aims to recover the hydrogen pressure of the bank by considering not only the residual pressure of the bank but also the filling capacity becomes effective.

Namely, according to the differential pressure filling method, in a case where the hydrogen gas has to be continuously supplied to the FCV, or in a case where a blank time is short, it is necessary to heighten an occupancy rate of the bank. If a time to recover the bank to a fully-filled state is short, the hydrogen gas may be supplied to more high-pressure banks, the time to supply the hydrogen gas to the FCV may be shortened, and, a waiting time of the hydrogen gas supply may be shortened.

By the way, when there are plural target banks to which the hydrogen gas has to be supplied from the compressor, as a timing to select the target bank, other than timing when the hydrogen gas supply to the FCV comes to end, at optional timing such as timing when one bank reaches the fully-filled state by the hydrogen gas supply from the compressor, a bank to which the hydrogen gas is supplied from the compressor may be selected.

Next, a second method will be described. According to this method, a criterion for selecting a bank that may be filled to the fully-filled state the fastest is determined in advance, based on the criterion, when there are plural banks in which the pressure decreased, a bank that may be filled to the fully-filled state the fastest is selected and the hydrogen gas is filled.

The criterion tabulates the relation between the pressure of each bank and the time necessary to reach the fully-filled state of the bank considering the hydrogen gas supply capacity due to the compressor unit. When comparing the pressure of each bank, it may be determined which bank may be filled to the fully-filled state the fastest. By setting the criterion in advance, only by measuring the pressure of each bank, instantly, a bank to be a target may be selected.

Furthermore, the criterion, for example, may be the time necessary to fill a bank to a fully-filled state, or may be a criterion set in advance by a comprehensively evaluated index such as a capacity of a bank or a peak time zone or other relation parameter.

Figure 4:
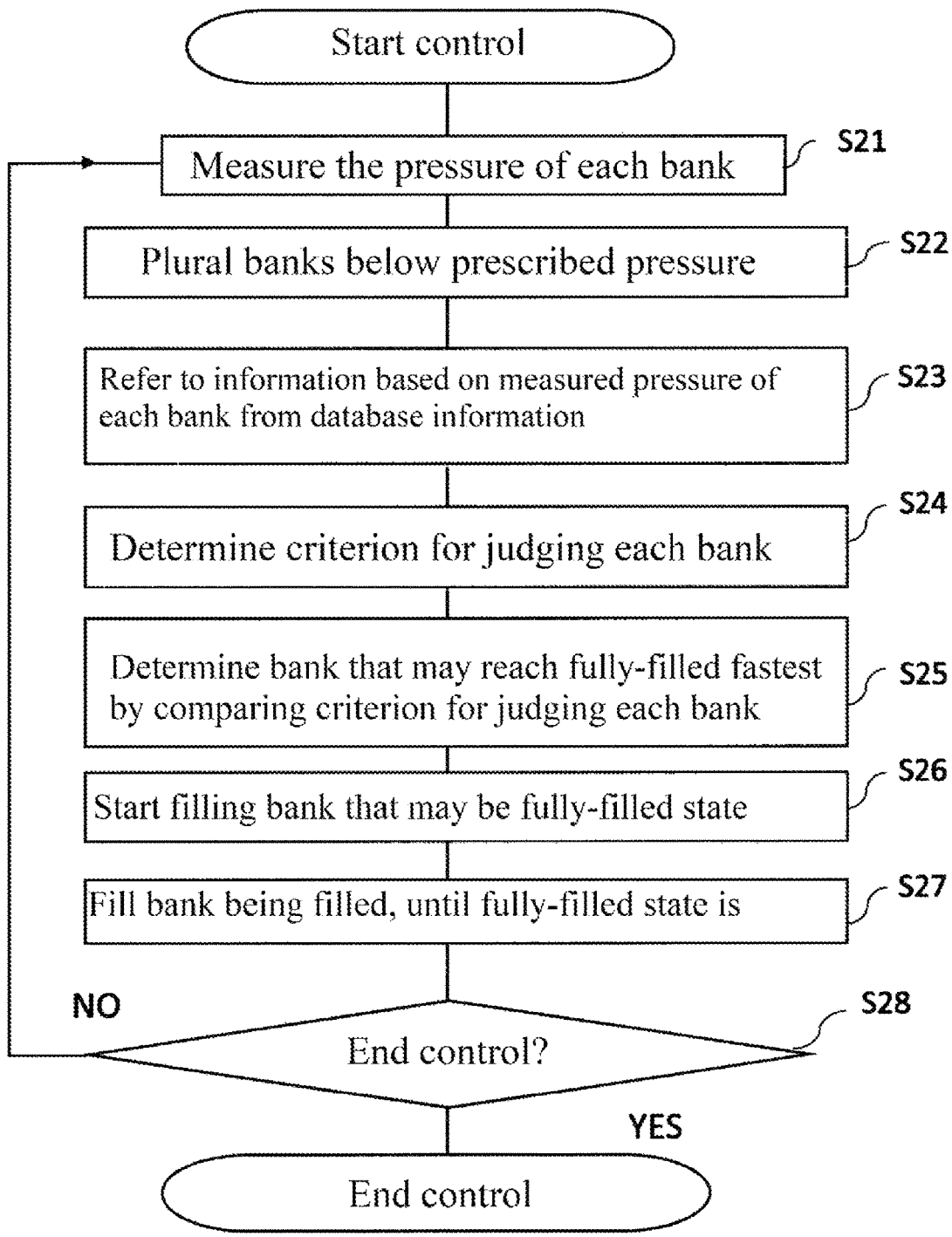
FIG. 4 is a flowchart of a hydrogen gas filling method according to a third embodiment.

Subsequently, a method of tabulating in advance a bank to be selected based on the hydrogen residual pressure that is a second method will be described. FIG. 4 is a flowchart of a hydrogen gas filling method according to the second method. In order to control a bank that supplies the hydrogen gas, first, the pressure of each bank is measured by a (not shown) pressure meter (step S21). Next, a measured pressure value of each bank is supplied to a (not shown)

controller, and it is determined whether there are plural banks in which the pressure is below the predetermined pressure (step S22).

When there are plural banks in which the pressure is below the predetermined pressure, a criterion based on the measured pressure of each bank is compared with a prescribed criterion (step S23). The tabulated criterion is stored in a data base, and by referencing to information of the data base, a judgement criterion is determined. For example, when the judgement criterion is time necessary to fully fill the bank, the time necessary to fully fill each bank is determined (step S24). Then, by comparing the criterion of each bank (by comparing the time necessary to fully fill each bank), a selected filling bank (a bank that may be fully-filled fastest) may be determined (step S25).

When the selected filling bank (a bank that may be filled to the fully-filled state the fastest) is determined, by controlling the valve unit 20 to supply the hydrogen gas to the selected bank from the compressor unit 18, the filling of the hydrogen gas to the selected filling bank (the bank that may be filled to the fully-filled state the fastest) is started (step S26). The supply of the hydrogen gas by the compressor unit 18 is performed until the bank being filled reaches the fully-filled state (step S27). When the bank reaches the fully-filled state, by controlling the valve unit 20, the hydrogen gas supply of the selected bank is stopped. Next, it is determined whether the control of the hydrogen gas supply by the compressor unit 18 is stopped (step S28). When judged to be the control end, the control is stopped. Furthermore, when it is determined necessary to supply the hydrogen gas to the other plural banks, the method returns to the Step S21 to repeat the bank selection flow.

Thus, when there are plural target banks in which the hydrogen residual pressure is below a predetermined value, a bank that may be filled to the fully-filled state the fastest is selected as a filling bank and the hydrogen gas is filled.

By the way, the database information may be formed into a receiving/transmitting configuration based on information that becomes a judgement criterion from a server via internet circuit or information based on the pressure of the bank. Furthermore, when the compressor unit supplies the hydrogen gas to the accumulator unit, time and pressure variation from start of the hydrogen gas filling to the bank to reach the fully-filled state are recorded, and it may be formed into a configuration that may make a failure prediction and diagnosis of the hydrogen station package unit and the hydrogen station apparatus.

An example embodiment of the present invention will be described below with reference to schematic drawings. FIG. 5 is a chart diagram showing one example of the hydrogen gas supply from a compressor to a bank. In the present example, each bank is in a fully-filled state at 82 MPa. Furthermore, the supply of the hydrogen gas from the compressor to the bank is started when the residual pressure of the bank becomes below 80 MPa. By the way, the residual pressure of each bank may be measured continuously or every definite time.

By the way, a condition of the pressure at the fully-filled state of the bank or the pressure starting the filling of the hydrogen gas from the compressor to the bank may be appropriately changed.

First, the supply of the hydrogen gas to the FCV from a fully-filled state where all banks are in the fully-filled state is performed. As of T1, the hydrogen gas is supplied to a first FCV from a first bank having the largest capacity (broken line). By the supply of the hydrogen gas to the first FCV, the hydrogen pressure of the first bank gradually decreases, and at a time point when the residual pressure becomes below 80 MPa, the supply of the hydrogen gas from the compressor to the first bank is started (broken line).

At this stage, while the hydrogen gas being supplied from the first bank to the first FCV, also the filling of the hydrogen gas from the compressor to the first bank is performed. However, since a supply amount of the hydrogen gas from the compressor is very small compared with a supply amount of the hydrogen gas from the first bank to the first FCV, the pressure of the first bank does not recover in this state, but a decrease rate of the pressure of the first bank slows.

When the hydrogen gas is supplied from the first bank to the first FCV, since the hydrogen pressure of the first bank decreases while the hydrogen pressure of the hydrogen tank of the first FCV increases, the pressure difference between the first bank and the hydrogen tank of the first FCV gradually becomes smaller, thereby, a supply speed of the hydrogen gas to the hydrogen tank of the first FCV gradually slows.

There, if the condition is less than the preset condition (for example, hydrogen pressure of the hydrogen tank of the FCV, the differential pressure between the bank and the hydrogen tank of the FCV, supply speed of the hydrogen gas or the like), a bank that supplies the hydrogen gas to the hydrogen tank of the first FCV is switched from the first bank to the second bank (alternate long and short line). Thereby, the differential pressure between the bank and the hydrogen tank of the first FCV is increased, and the supply speed of the hydrogen gas to the first FCV is increased.

When the hydrogen gas is supplied from the second bank to the first FCV, the pressure of the second bank gradually decreases to be below 80 MPa. At the time point also the second bank satisfies a condition of starting the filling of the hydrogen gas from the compressor. In the present example, as it is, the filling of the hydrogen gas to the first bank is continued.

To the first FCV, the hydrogen tank of the first FCV reaches a fully-filled state by the supply of the hydrogen gas by the second bank, and the supply of the hydrogen gas to the first FCV comes to an end. At the time point of T2, a bank to which the hydrogen gas is supplied from the compressor is reviewed.

As shown in FIG. 5, when compared based on the hydrogen residual pressure, the first bank is higher than the second bank, but as a target bank to which the hydrogen gas is supplied from the compressor, the second bank is selected.

A reason why the second bank is selected as the target bank is as follows. At this time point, although there are two target banks (banks in which the hydrogen residual pressure is below 80 MPa), the first bank and the second bank, to which the hydrogen gas should be supplied from the compressor, while the capacity of the first bank is larger than that of the second bank, when compared based on the time required to reach the fully-filled state, it is judged that one that may be filled to the fully-filled state in a shorter time is judged to be the second bank. As a filling bank that is to be supplied the hydrogen gas from the compressor, the second bank is selected.

Here, the "time necessary" until the fully-filled full state is reached depends on a fill amount of the hydrogen gas necessary to reach the fully-filled state of each bank, and the supply capacity of the hydrogen gas to each bank by the compressor. There, the judgement of the filling bank may be performed by the following (1) or (2).

(1) First, from the hydrogen pressure (residual pressure) of the bank to which the hydrogen gas should be supplied from the compressor, a hydrogen gas amount necessary for the bank to be in the fully-filled state is calculated. Next, the time necessary to fill the hydrogen gas amount is calculated from the hydrogen gas supply capacity of the compressor. The target bank of which the calculated time is shorter is selected as a filling bank.

(2) First, about each bank, based on the hydrogen pressure (residual pressure) and the hydrogen gas supply capacity by the compressor, based on a relation with the time necessary until the fully-filled state is reached from the hydrogen pressure, when the hydrogen pressure of each bank is compared, a criterion to select which bank is selected as the filling bank is determined in advance. According to the criterion, by setting a parameter, or by tabulating, in advance, by only measuring the hydrogen pressure of the bank, instantly, a filling bank may be selected.

In an example shown in FIG. 5, a case is shown where while the hydrogen gas is supplied to the second bank, from the time point T3, hydrogen gas is supplied to the second FCV. In this case, first, the supply of the hydrogen gas to the second FCV is performed from the first bank. During this time, the supply of the hydrogen gas from the compressor to the second bank is continued. Next, accompanying a decrease of the hydrogen pressure of the first bank, the supply of the hydrogen gas to the second FCV is switched to the second bank. Also, during this time, the supply of the hydrogen gas to the second bank from the compressor is continued.

When the hydrogen pressure of the second bank decreases, and the pressure difference with the hydrogen tank of the second FCV becomes smaller, furthermore, the supply of the hydrogen gas to the second FCV is switched from the second bank to the third bank (alternate long and two short dashed line). Also, during the supply of the hydrogen gas from the third bank to the second FCV, the supply of the hydrogen gas from the compressor to the second bank is continued.

When the second FCV reaches the fully-filled state by the supply of the hydrogen gas from the third bank, the supply of the hydrogen gas to the second FCV comes to an end. At the time point T4, a target bank to which the filling of the hydrogen gas should be performed from the compressor becomes all of first, second and third banks. There, the residual pressures of the first, second and third banks are measured respectively, according to the above-described method (1) or (2), and a filling bank to which the hydrogen gas is supplied from the compressor is selected. Here, the third bank is selected as the filling bank.

In an example shown in FIG. 5, until all banks reach the fully-filled state, the supply of the hydrogen gas from the banks to an FCV is not performed, and at the time point when the third bank reaches the fully-filled state, in the similar manner, the second bank is selected as a next filling bank to which the filling of the hydrogen gas is performed from the compressor. When in the order of the second bank followed by the first bank, the fully-filled state is reached, the filling of the hydrogen gas to the banks from the compressor is terminated, and waits until a supply of the hydrogen gas to a third and subsequent FCVs.

The above-described example is one example, and various patterns are considered depending on the difference such as arrival frequency of the FCVs, the residual pressure of the hydrogen tank or the like. For example, there may be a case where after the completion of the hydrogen gas supply to the first FCV, there is sufficient time for all banks to be filled to the fully-filled state. There may also be a case where after the completion of the hydrogen gas supply to the second FCV, but before all banks are filled to the fully-filled state, the supply of the hydrogen gas to the next FCV is performed. In any case, by selecting the filling bank to which the supply of the hydrogen gas is performed from the compressor according to the above-described method, typically, the high-pressure bank may be maintained, and the supply of the hydrogen gas to the FCV becomes advantageous.

When there are plural target banks to which the hydrogen gas shroud be supplied from the compressor, as the timing of selecting the filling bank, for example, the time point when the supply of the hydrogen gas to the FCV came to an end or a time point when one bank became filled to the fully-filled state by the supply of the hydrogen gas from the compressor may be cited. However, without limiting to these, a selection timing may be appropriately set. For example, at a time point when the target banks become plural, the filling bank may be selected. In the previous example, at the time of hydrogen gas supply to the first FCV, the timing when the pressure of the second bank became below 80 MPa corresponds to this, at the time point, the bank to which the hydrogen gas is filled may be switched from the first bank to the second bank.

The above is one example, when the target banks are plural, within the technology of selecting the bank that may be filled to the fully-filled state the fastest, other embodiments may be formed. For example, in a case when the filling of the hydrogen gas is performed from the bank to the FCV, the selection or switching of the bank is basically controlled at the dispenser. In the above example, in a case when all banks are in the fully-filled state and the hydrogen gas is supplied to the FCV, usually, the supply of the hydrogen gas is performed from the first bank having the largest capacity, and as needs arise, is switched to the second bank or the third bank. Temporarily, in the case where the supply of the hydrogen gas to the FCV is performed in a state where each bank changed from the fully-filled state to a state where the respective residual pressure decreased, by considering a hydrogen gas amount necessary until the full filling of the FCV, and the capacity and the residual pressure of each bank, a bank may be selected such that the hydrogen gas is most efficiently supplied.

For example, although the supply of the hydrogen gas to the FCV is advantageous to perform in a bank having a large hydrogen residual pressure and the differential pressure of the FCV, even if a bank having a relatively low hydrogen residual pressure, when in a case where a bank capacity is large and a plenty of hydrogen gas may be supplied at the same time, the bank may be selected.

In the case described above, by considering bank selection due to the dispenser when the supply of the hydrogen gas to the FCV is performed, a filling bank that performs the filling of the hydrogen gas from the compressor may be selected. Namely, in the above example, even if the first bank is in a state where it may be filled to a fully-filled state the fastest, for example, by considering efficiency of the supply of the hydrogen gas to the FCV, in the case where first it is assumed that the hydrogen residual pressure of the firsts bank becomes low by performing the supply of the hydrogen gas from the first bank, it is possible to select a bank other than the first bank as a filling bank. Thus, by controlling the hydrogen gas filling to the bank by receiving information on the dispenser side and in cooperation therewith, there is a case where the high-pressure bank may be more efficiently maintained.

As was described above, according to the filling method of the present invention, when the filling bank to which the hydrogen gas should be filled from the compressor is selected, it is selected not by the residual pressure of the bank, but by longest and shortest times until the bank reaches the fully-filled state. Then, as a specific means thereof, (1) a method of calculating the filling time by considering the hydrogen residual pressure and the capacity of the bank, and (2) a method of tabulating in advance a bank to be selected based on the hydrogen residual pressure of the bank are proposed.

Then, according to the present invention, since a bank having the shortest time for reaching the fully-filled state is selected as the filling bank and the filling of the hydrogen gas is performed from the compressor, compared with a filling method in which the filling of the hydrogen gas is performed only from a bank having high residual pressure, a more high-pressure bank is easily maintained. In particular, in a case where even the residual pressure of all of the plural banks decreased, the supply of the hydrogen gas to the FCV is performed and the like, since the supply of the hydrogen gas to the bank by the compressor becomes severe, a filling method aims to recover of the hydrogen pressure of the bank by considering not only the residual pressure of the bank but also the filling capacity becomes effective.

REFERENCE SIGNS LIST

10 Simple type hydrogen station
18 Compressor unit
19 Accumulator unit
20 Valve unit
50 FCV (fuel cell vehicle)

The invention claimed is:

1. A hydrogen gas filling method, comprising:
   detecting two or more target banks among a plurality of banks, each target bank being a bank of the plurality of banks which has a pressure that is below a predetermined pressure, the two or more target banks being detected at a same time point;
   for each target bank, calculating a hydrogen gas filling amount necessary for the target bank to be completely filled, and determining a necessary filling time for the target bank to be completely filled based on the calculated hydrogen gas filling amount;
   selecting the target bank having a shortest necessary filling time as a filling bank; and
   supplying hydrogen gas to the selected filling bank from a compressor.

2. The hydrogen gas filling method according to claim 1, wherein the plurality of banks includes at least one bank having a capacity that is different from that of other banks of the plurality of banks.

3. A hydrogen gas filling method, comprising:
   detecting two or more target banks among a plurality of banks, each target bank being a bank of the plurality of banks which has a pressure that is below a predetermined pressure, the two or more target banks being detected at a same time point;
   comparing a predetermined criterion for each target bank so as to determine the target bank having a shortest necessary filling time to be completely filled, wherein the predetermined is based on a predetermined relationship between the pressure of each bank and a necessary filling time for each bank to be completely filled;
   selecting the target bank having the shortest necessary filling time as a filling bank; and
   supplying hydrogen gas to the selected filling bank from a compressor.

4. The hydrogen gas filling method according to claim 3, wherein the plurality of banks includes at least one bank having a capacity that is different from that of other banks of the plurality of banks.

5. A hydrogen gas filling method, comprising:
   supplying hydrogen gas to a fuel cell vehicle (FCV) that is a predetermined hydrogen supply destination from one bank of a plurality of banks, wherein the plurality of banks includes at least one bank having a capacity that is different from that of other banks of the plurality of banks;
   while supplying hydrogen gas to the FCV, detecting two or more target banks among the plurality of banks, each target bank being a bank of the plurality of banks which has a pressure that is below a predetermined pressure, the two or more target banks being detected at a same time point;
   selecting the target bank having a shortest necessary filling time to be completely filled as a filling bank;
   supplying hydrogen gas to the selected filling bank from a compressor; and
   selecting a different target bank as the filling bank when either hydrogen gas supply to the FCV completes, or the different target bank becomes the target bank having the shortest necessary filling time to be completely filled.

6. A hydrogen gas filling method, comprising:
   hydrogen gas to a fuel cell vehicle (FCV) that is a predetermined hydrogen supply destination from one bank of a plurality of banks, wherein the plurality of banks includes at least one bank having a capacity that is different from that of other banks of the plurality of banks;
   while supplying hydrogen gas to the FCV, detecting two or more target banks among the plurality of banks, each target bank being a bank of the plurality of banks which has a pressure that is below a predetermined pressure, the two or more target banks being detected at a same time point;
   selecting a bank that can supply the hydrogen gas most efficiently as a bank that performs hydrogen gas supply to the FCV, by considering a hydrogen gas amount necessary until full-filling of the FCV, and a capacity and a hydrogen residual pressure of each bank;
   selecting a target bank as a filling bank, wherein the selected target bank is the target bank having a shortest necessary filling time to be completely filled of all target banks other than the bank that can supply the hydrogen gas most efficiently; and
   supplying hydrogen gas to the selected filling bank from a compressor.

7. A hydrogen station comprising:
   an accumulator unit having a plurality of banks, the plurality of banks including at least one bank having a capacity that is different from that of other banks of the plurality of banks;
   a compressor unit connected to the accumulator unit and configured to supply hydrogen gas to the accumulator unit;
   a dispenser unit configured to supply hydrogen gas to a fuel cell vehicle (FCV) from one bank of the plurality of banks;

a controller configured to determine whether one or more banks of the plurality of banks is a target bank, each target bank being a bank of the plurality of banks which has a pressure that is below a predetermined pressure; and a valve unit configured to control a supply of hydrogen gas from the compressor to the plurality of banks of the accumulator unit, such that when only the one bank is determined to be a target bank, hydrogen gas is supplied to the target bank from the compressor while continuing to supply hydrogen gas to the FCV, and when plural banks are determined to be target banks at a same time point, hydrogen gas is supplied from the compressor to the target bank having a shortest necessary filling time to be completely filled, and hydrogen gas is supplied to a different target bank when either hydrogen gas supply to the FCV is completed, or the different target bank becomes the target bank having the shortest necessary filling time to be completely filled.

* * * * *